(12) United States Patent
Sheerin et al.

(10) Patent No.: US 9,994,722 B2
(45) Date of Patent: Jun. 12, 2018

(54) REDUCED POINT OF SALE BASES FOR MULTI-FINISH PAINT LINE AND METHODS FOR SAME

(71) Applicant: Columbia Insurance Company, Omaha, NE (US)

(72) Inventors: Robert J. Sheerin, North Caldwell, NJ (US); Navin Tilara, Roseland, NJ (US); Michael Bochnik, Yonkers, NY (US); Stefanie Iannaconne, Hoboken, NJ (US); Samantha Marie Mascetti, Hackensack, NJ (US)

(73) Assignee: Columbia Insurance Company, Omaha, NE (US)

( * ) Notice: Subject to any disclaimer, the term of this patent is extended or adjusted under 35 U.S.C. 154(b) by 0 days. days.

(21) Appl. No.: 14/865,704

(22) Filed: Sep. 25, 2015

(65) Prior Publication Data
US 2017/0088723 A1   Mar. 30, 2017

(51) Int. Cl.
| | | |
|---|---|---|
| C09D 7/80 | (2018.01) | |
| C09D 5/02 | (2006.01) | |
| C09D 17/00 | (2006.01) | |
| C08K 3/36 | (2006.01) | |

(52) U.S. Cl.
CPC ............... *C09D 7/80* (2018.01); *C09D 5/024* (2013.01); *C09D 7/42* (2018.01); *C09D 7/65* (2018.01); *C09D 17/001* (2013.01); *C08K 3/36* (2013.01)

(58) Field of Classification Search
CPC ........... C09D 7/14; C09D 7/005; C09D 7/125
See application file for complete search history.

(56) References Cited

U.S. PATENT DOCUMENTS

| | | | |
|---|---|---|---|
| 3,122,272 A | 2/1964 | Marsh | |
| 4,782,109 A | 11/1988 | DuLaney et al. | |
| 5,014,883 A | 5/1991 | Airaksinen | |
| 5,124,393 A | 6/1992 | Ingle et al. | |
| 5,558,251 A | 9/1996 | Neri | |
| 5,672,649 A | 9/1997 | Brock et al. | |
| 5,897,698 A | 4/1999 | Bellas | |
| 5,934,513 A | 8/1999 | Bellas | |
| 5,938,080 A | 8/1999 | Haaser et al. | |
| 6,022,517 A | 2/2000 | Fairchild et al. | |
| 6,071,336 A | 6/2000 | Fairchild et al. | |
| 6,221,145 B1 | 4/2001 | McClain et al. | |
| 6,531,537 B2 | 3/2003 | Friel et al. | |
| 6,585,012 B1 | 7/2003 | Iovino | |
| 6,613,832 B2 | 9/2003 | Friel et al. | |
| 6,652,642 B2 | 11/2003 | Sare et al. | |
| 6,656,998 B1 | 12/2003 | Robeson et al. | |
| 6,689,824 B2 | 2/2004 | Friel et al. | |
| 7,339,000 B1 | 3/2008 | McClain et al. | |
| 7,919,546 B2 | 4/2011 | Trevino, III et al. | |
| 2002/0002934 A1 | 1/2002 | Nungesser et al. | |
| 2002/0013401 A1 | 1/2002 | Friel et al. | |
| 2002/0016405 A1 | 2/2002 | Friel et al. | |
| 2003/0110101 A1 | 6/2003 | Friel et al. | |
| 2003/0232913 A1 | 12/2003 | Bakule | |
| 2004/0059041 A1 | 3/2004 | McClain et al. | |
| 2009/0126826 A1 | 5/2009 | Smith | |
| 2009/0310856 A1 | 12/2009 | Korenkiewicz et al. | |
| 2010/0068397 A1* | 3/2010 | Taylor | C09D 5/02 427/384 |
| 2012/0157595 A1* | 6/2012 | Gaston | C09D 133/08 524/400 |
| 2014/0256868 A1* | 9/2014 | Hibben | C09D 5/00 524/521 |
| 2015/0057406 A1* | 2/2015 | Dandreaux | C09D 7/65 524/504 |

FOREIGN PATENT DOCUMENTS

| | | |
|---|---|---|
| WO | 9523197 | 8/1995 |
| WO | 2004061021 A1 | 7/2004 |

OTHER PUBLICATIONS

International Search Report and Written Opinion issued in connection with the corresponding International Application No. PCT/US2016/052109 dated Dec. 2, 2016.

* cited by examiner

Primary Examiner — Colin W. Slifka
Assistant Examiner — Colette Nguyen
(74) *Attorney, Agent, or Firm* — The H.T. Than Law Group

(57) ABSTRACT

Disclosed herein is a method for adjusting factory-made tintable paints at the point of sale by adding at least one gloss modifier to the factory-made tintable paints without substantially changing the amount of opacifying pigments in the tintable paints, so that a single color prescription can be used to tint the paints to a single color for any gloss or sheen. Such same color paints should have a color difference of less than 2.0 CIEDE2000 units. Also disclosed is an aqueous gloss reducer that contains mostly a matting agent with substantially no latex resin and substantially no opacifying pigments.

17 Claims, 1 Drawing Sheet

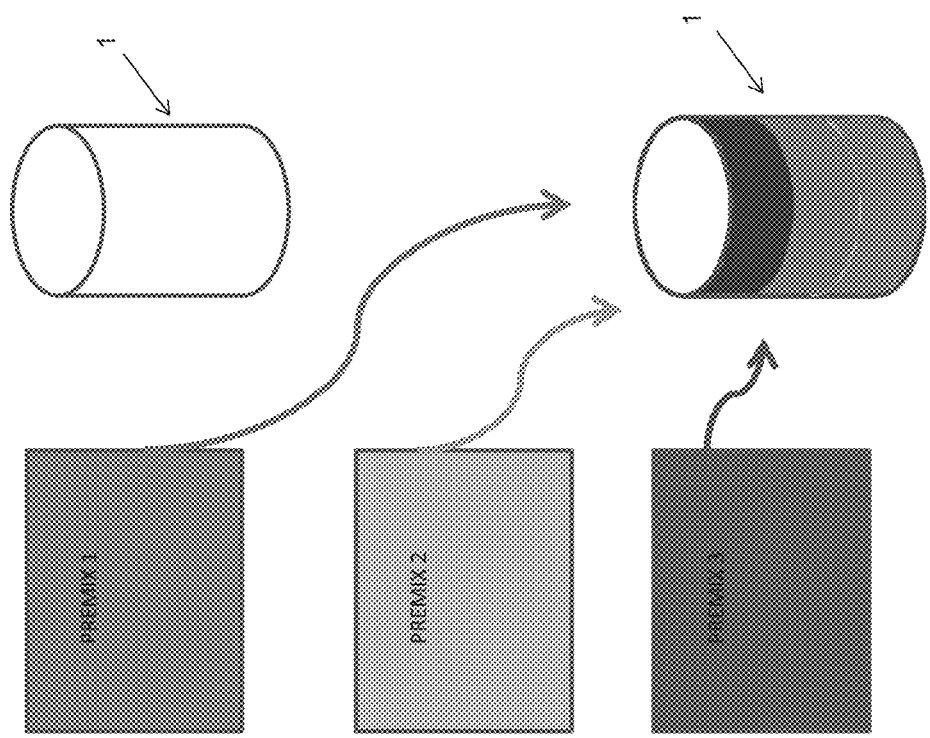
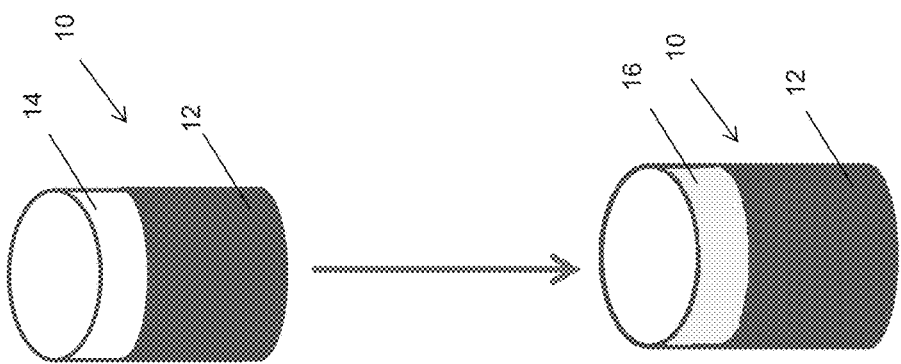

REDUCED POINT OF SALE BASES FOR MULTI-FINISH PAINT LINE AND METHODS FOR SAME

FIELD OF THE INVENTION

This invention generally relates to a system and method for adjusting factory-manufactured paints at the points of sale or points of use by adjusting the paints' sheen or finishes. The present invention also relates to reducing the number of factory-manufactured tintable bases or paint bases to reduce the number of color prescriptions for a single color at the points of sale or points of use.

BACKGROUND OF THE INVENTION

Manufacturing paints by mixing pre-paint modules has been discussed in the patent literature. For example, U.S. Pat. No. 5,672,649 to Brock et al discloses five or more modules for making special effect paints, including (a) special effect module, (b) binder module, (c) dye module, (d) rheology module and (e) cross-linking module. Four modules contain various binders and the fifth module may also contain binder. The special effect module and the dye module contain pigments.

U.S. Pat. No. 6,221,145 to McClain and its progenies, i.e., subsequent cases that claims priority thereto, disclose manufacturing paints at the point of sale by mixing four pre-paints, including (a) pigment module, (b) dispersant thickener/diluent module, (c) low resin module and (d) high resin module. The low resin module contains a number of extender pigments as well as resin and the pigment module may contain small amount of resin. Progeny U.S. Pat. No. 7,339,000 to McClain et al further explains that the four modules can be varied to produce various color bases so that they are suitable for use to make different paint colors. Progeny U.S. Pat. No. 7,919,546 to Trevino et al adds an extender pre-paint and teaches that the pre-paints can be varied to produce paints with various tint bases so that they are suitable for use to form different types of color paints. Trevino also discloses that every formula or recipe for every base paints can be entered into a database for the retail paint production apparatus to produce all the paints that can be produced at the factories. McClain and its progenies do not disclose simple manufacturing process at the point of sale.

U.S. Pat. No. 6,531,537 to Friel et al teaches another point of sale paint manufacturing technique, which has three principal pre-paints: (i) opacifying pre-paint, (ii) extender pre-paint, and (iii) binder pre-paint. Properties of the paint, such as sheens/finishes, tint bases, etc., can be varied at the point of sale when these three pre-paints are mixed with one or more of the same pre-paints. Friel acknowledges that point of sale manufacturing has its drawbacks, including inconsistent key properties of paints, such as viscosity, gloss or color. Friel proposes to test for the key properties through feedback loops in the paint making machine to ensure that these properties are controlled.

Presently, commercial paint manufacturing at the point of sale requires complex machineries at the retail stores. The manufacturing process has been shifted from the factory to the retail spaces, but without the quality controls and assurances that are provided by trained chemists and technicians. The control of bio-organisms that can live in aqueous paint compositions or precursors thereof is not clearly understood. Premature cross-linking of latexes in the aqueous phase during storage is not addressed. The disposal of waste and byproducts, such as pigment clumping and solidified paint films which must be handled in accordance to local disposal ordinances, is left to the retailers. Maintenance and cleaning of the manufacturing equipment must still be done by trained technicians. The manufacturing challenges that are typically handled by plants and factories are delegated to the retail levels with potentially undertrained operators.

The expected space saving and reduction in inventory are still unrealized, due to the complexities of the paint manufacturing now being proposed for the retail stores. Large tanks of precursor liquids must be stored, as well as the colorants and empty paint cans and buckets. Retail space must be reserved for the paint making machineries. FIG. 1 illustrates the paint manufacturing at the point of sale or the retail level, where empty cans or container 1 is filled with a number of premixes or pre-paint modules to make paints.

On the other hand, traditional retail paint stores typically carry factory-made tintable paints that can be mixed with colorants to make paints in five finishes (flat, matte, eggshell, satin and semi-gloss). Tintable paints can be classified into four bases, such as white, pastel/light, deep, or medium/mid-tone. Each base contains a different amount of opacifying pigments, such as titanium dioxide. Final paint colors depend significantly on the amount of $TiO_2$ white pigments in the tintable base. For example, deep colors require lower amounts of $TiO_2$ while pastel colors require higher amounts of $TiO_2$. White and medium bases likewise have different levels of $TiO_2$. To produce a wide variety of paint colors, retail stores generally need to store tintable paints in five finishes and four bases (1 base-4 base), i.e., about 20 different tintable base paints for each paint line. Paint lines are generally based on the paint quality, e.g., from premium lines to economy lines, ultra-low VOC paints, stains and specialty paints and coatings.

In one example, the color prescriptions for one particular color for various sheens/finishes for a single paint line vary depending on the amount of opacifying pigments contained in the bases.

| 1 Base, 4 Finishes (Pounds of $TiO_2$ per 100 gallons) | Exemplary Color Prescriptions for a Single Color |
|---|---|
| Semi-Gloss 1 Base (283 lbs.) | Magenta 0 × 19<br>Blue 0 × 17<br>Red 0 × 3 |
| Pearl/satin 1 Base (202 lbs.) | Magenta 0 × 15<br>Blue 0 × 18<br>Red 0 × 2.5 |
| Eggshell 1 Base (269 lbs.) | Yellow 0 × 7<br>Magenta 0 × 24<br>Blue 0 × 18 |
| Matt 1 Base (218 lbs.) | Magenta 0 × 17.5<br>Blue 0 × 17<br>Red 0 × 2 |
| Flat 1 Base (210 lbs.) | Magenta 0 × 18.5<br>Blue 0 × 16.5<br>Red 0 × 2.5 |

The remaining three tintable bases would have their own set of color prescriptions for the same color. Carrying up to 20 or more different tintable paints for each paint line requires significant storage at the traditional retail stores, and 20 different color prescriptions for each single color.

Hence, there remains a need to simplify the preparation of paints at the points of sale or points of use and to reduce the required storage of traditional paint stores.

SUMMARY OF THE INVENTION

Hence, the invention is directed to a simplified way to adjust the finishing of paints manufactured at the plants or factories by the traditional paint stores or at the point of sales that allows the paint stores to offer the same paints that they have always sold and to significantly reduce inventory.

In one embodiment, in addition to adding the colorants to the factory-made paints the retailers can add one or both of a gloss enhancer or a gloss reducer to the can or container that houses the factory-made paints to produce the desired finish of flat, matte, eggshell, satin or semi-gloss.

In another embodiment, the factory-made paints have a limited number of tintable bases per paint line, preferably three tintable bases per paint line or preferably two tintable bases per paint line.

These and other objects of the present invention are realized by a method for adjusting a factory-made tintable paint at a point of sale comprising the steps of (i) receiving the factory-made paint in a plurality of containers, wherein each container comprises a first amount of opacifying pigment, (ii) adding at least one of a gloss reducer or a gloss enhancer into at least one container, wherein the gloss reducer comprises a matting agent and wherein the gloss enhancer comprises a latex resin to produce a second tintable paint, (iii) wherein a second amount of opacifying pigment in the second tintable paint is substantially the same as the first amount.

Preferably, the first and second amounts of opacifying pigments are the same.

Preferably, the gloss reducer comprises from about 25% to about 40% matting agent, more preferably from about 25% to about 35% matting agent and more preferably from about 30% to about 35% matting agent. The matting agent may comprise a plurality of average sized silica particles. The gloss reducer should have from about 8% to about 14% of rheological modifier, preferably from about 9% to about 13% of rheological modifier, and more preferably from about 10% to about 12% of rheological modifier. The gloss reducer should also have from about 3% to about 7% of surfactants and dispersants. At least one colorant is added into said at least one container to form a tinted paint. These percentages are usable in all embodiments of the present invention.

The present invention is also directed to a method for adjusting tintable paint comprising the steps of (i) receiving or preparing the tintable paint, (ii) adding at least one of a gloss reducer or a gloss enhancer to the tintable paint to produce a plurality of second tintable paints having different glosses, (iii) tinting the plurality of second tintable paints with a single color prescription to produce a plurality of tinted paints, wherein the color difference between any two tinted paints with different glosses is less than about 2.0 CIEDE2000 units.

The color difference between any two tinted paints with different glosses is preferably less than about 1.0 CIEDE2000 unit and more preferably less than about 0.67 CIEDE2000 unit. The gloss reducer may comprise about 25% to about 40% matting agent, and the matting agent comprises a plurality of average sized silica particles.

The present invention is further directed to an aqueous gloss reducing composition substantially free of latex resin comprising about 25% to about 40% by weight of matting agent, about 8% to about 14% by weight of rheological modifier, and about 3% to about 7% by weight of surfactant and dispersant, wherein said composition is mixed with a paint to reduce the paint's gloss.

Preferably, the gloss reducing composition comprises substantially no opacifying pigment. The matting agent may comprise a plurality of average sized silica particles. The gloss reducing composition preferably comprises no latex resin.

BRIEF DESCRIPTION OF THE DRAWINGS

In the accompanying drawings, which form a part of the specification and are to be read in conjunction therewith and in which like reference numerals are used to indicate like parts in the various views:

FIG. 1 illustrates a conventional paint manufacturing at the point of sale or retail store; and FIG. 2 illustrates the inventive process of adjusting sheens and finishes of factory-manufactured tintable paints at the point of sale.

DETAILED DESCRIPTION OF THE PREFERRED EMBODIMENTS

In accordance with an embodiment of the present invention, plants and factories would continue to manufacture paints albeit at significantly fewer tintable paint bases. Preferably, two or three tintable paint bases are manufactured that can be tinted at the point of sale or point of use to any color in any finishes in any paint line. As used hereinafter, point of sale includes point of use. Each of the two bases or each of the three bases would have a fixed amount of opacifying pigment, such as $TiO_2$, so that the color prescription for a single color remains unchanged for any finish made from this one paint base.

As discussed further below, at the points of sale one or two additional components are added to the tintable paint bases. A gloss reducer or flattener and/or a gloss enhancer are added to the tintable paint bases to adjust the sheen or finish of the final tinted paints. Both the gloss reducer and the gloss enhancer contain no significant amount of opacifying pigment or preferably no opacifying pigments, such as $TiO_2$, or so that the additions of the gloss enhancer and gloss reducer would not change or alter the color prescriptions.

Referring to FIG. 2, factory-manufactured tintable paint container 10 at the point of sale contains an amount of tintable paint 12 with space 14 above it. Space 14 is sized and dimensioned to receive gloss adjuster/modifier 16, which includes one or both of gloss reducer or gloss enhancer.

In the example given above, the number of color prescriptions is reduced to one for a single tintable base.

| 1 Base, 4 Finishes (Pounds of $TiO_2$ per 100 gallons) | Exemplary Color Prescriptions for a Single Color | Inventive Pastel Base for All sheen/finishes |
|---|---|---|
| Semi-Gloss 1 Base (283 lbs.) | Magenta 0 × 19<br>Blue 0 × 17<br>Red 0 × 3 | 230 lbs. of $TiO_2$<br>Magenta 0 × 18<br>Blue 0 × 16 |
| Pearl/satin 1 Base (202 lbs.) | Magenta 0 × 15<br>Blue 0 × 18<br>Red 0 × 2.5 | Red 0 × 3 |
| Eggshell 1 Base (269 lbs.) | Yellow 0 × 7<br>Magenta 0 × 24<br>Blue 0 × 18 | |

-continued

| 1 Base, 4 Finishes (Pounds of TiO$_2$ per 100 gallons) | Exemplary Color Prescriptions for a Single Color | Inventive Pastel Base for All sheen/finishes |
|---|---|---|
| Matt 1 Base (218 lbs.) | Magenta 0 × 17.5 Blue 0 × 17 Red 0 × 2 | |
| Flat 1 Base (210 lbs.) | Magenta 0 × 18.5 Blue 0 × 16.5 Red 0 × 2.5 | |

With the number of bases reduced to two or three, only two or three color prescriptions are necessary for a single color in a single paint line, instead of up to 20 color prescriptions for a single color.

In one embodiment, the present invention utilizes three bases: Pastel base or 1 base, Medium base or ⅔ base and deep base or 4 base. In another embodiment, the medium base is omitted and equal amounts of the pastel base and the deep base are combined to produce the medium base at the point of sale or more preferably at the plant.

The amount of opacifying pigments, such as TiO$_2$, is preferably elevated in the tintable base paints manufactured at the factories, so that sufficient amount of TiO$_2$ remains in the final tinted paints to provide adequate hiding. Additionally, the containers for the factory manufactured tintable base paints should have room for the addition of gloss enhancer, gloss reducer or both, as well as colorants, as shown in FIG. 2.

Paints are typically contained in gallon size cans or buckets, and in five gallon pails. For gallon size containers, pastel tintable base paints take up about 102 ounces leaving about 24 ounces for the additions of gloss reducer and/or gloss enhancer and 2 ounces of colorants. Deep tintable base paints take up about 95 ounces, about 20 ounces for gloss reducer/gloss enhancer and about 13 ounces for colorants. Medium tintable base paints take up about 100 ounces leaving about 20 ounces for gloss enhancer/gloss reducer and 8 ounces of colorants. Properties of exemplary final tinted paints are shown below.

Pastel Base Paints

| Pastel Base Paints | Semi-gloss | Satin | Eggshell | Matt | Flat |
|---|---|---|---|---|---|
| Gloss reducer | 0 oz. | 6 oz. | 12 oz. | 18 oz. | 24 oz. |
| Gloss enhancer | 24 oz. | 18 oz. | 12 oz. | 6 oz. | 0 oz. |
| Gloss (60°) | 48.4 | 18.8 | 9.2 | 5.5 | 3.3 |
| Sheen (85°) | 87.1 | 44.0 | 21.6 | 12.6 | 6.3 |
| Viscosity (KU) | 94.1 | 93.3 | 92.0 | 90.4 | 92.5 |
| Viscosity (ICI) | 1.087 | 0.992 | 0.983 | 0.971 | 0.904 |
| Flow leveling | 7.0 | 8.0 | 8.0 | 9.0 | 9.0 |
| Sag | 12 | 12 | 12 | 12 | 12 |
| Low Temperature Coalescence | 7 | 8 | 9 | 8 | 8 |
| Color Transfer | 5.0 | 5.0 | 5.0 | 5.0 | 5.0 |
| Blocking | 1.0 | 1.0 | 1.0 | 1.5 | 2.0 |
| Water sensitivity | 1.0 | 1.0 | 1.0 | 1.0 | 1.0 |
| Water stain | 3.0 | 3.0 | 2.0 | 2.0 | 2.0 |
| Wet Adhesion (Scratch off) | 1.0 | 1.0 | 1.0 | 1.0 | 1.0 |
| Wet adhesion (7 days) | 4.5 | 4.5 | 5.0 | 4.5 | 5.0 |
| Scrub | 906/1068 | 792/998 | 830/974 | 772/897 | 649/823 |

Deep Base Paints

| Deep Base Paints | Semi-gloss | Satin | Eggshell | Matt | Flat |
|---|---|---|---|---|---|
| Gloss reducer | 0 oz. | 5 oz. | 10 oz. | 15 oz. | 20 oz. |
| Gloss enhancer | 20 oz. | 15 oz. | 10 oz. | 5 oz. | 0 oz. |
| Gloss (60°) | 53.7 | 18.4 | 9.3 | 4.9 | 2.9 |
| Sheen (85°) | 85.5 | 37.6 | 18.4 | 9.4 | 5.5 |
| Viscosity (KU) | 89.8 | 91.3 | 93.0 | 94.8 | 96.2 |
| Viscosity (ICI) | 1.100 | 1.075 | 1.096 | 1.179 | 1.179 |
| Flow leveling | 5.0 | 6.0 | 6.0 | 6.0 | 7.0 |
| Sag | 12 | 12 | 12 | 12 | 12 |
| Rub Up | 5 | 5 | 5 | 5 | 5 |
| Low Temperature Coalescence | 4 | 8 | 7 | 7 | 12 |
| Color Transfer | 2.0 | 2.0 | 2.0 | 1.0 | 1.0 |
| Blocking | 4.5 | 1.0 | 1.0 | 1.5 | 4.5 |
| Water sensitivity | 1.0 | 1.0 | 1.0 | 1.0 | 1.0 |
| Water stain | 4.0 | 3.0 | 2.0 | 2.0 | 2.0 |
| Wet Adhesion (Scratch off) | 1.0 | 1.0 | 1.0 | 1.0 | 1.0 |
| Wet adhesion (7 days) | 1.0 | 4.0 | 5.0 | 5.0 | 5.0 |
| Scrub | 174/211 | 201/222 | 121/243 | 174/245 | 169/193 |

Medium Base Paints

| Paint Deep Base | Semi-gloss | Satin | Eggshell | Matt | Flat |
|---|---|---|---|---|---|
| Gloss reducer | 0 oz. | 5 oz. | 10 oz. | 15 oz. | 20 oz. |
| Gloss enhancer | 20 oz. | 15 oz. | 10 oz. | 5 oz. | 0 oz. |
| Gloss (60°) | 56.9 | 22.5 | 11.7 | 6.6 | 3.8 |
| Sheen (85°) | 84.7 | 42.9 | 22.1 | 11.4 | 6.3 |
| Viscosity (KU) | 87.9 | 88.9 | 90.7 | 91.5 | 93.3 |
| Viscosity (ICI) | 1.183 | 1.242 | 1.292 | 1.175 | 1.229 |
| Flow leveling | 4.0 | 4.0 | 5.0 | 5.0 | 5.0 |
| Sag | 12 | 12 | 12 | 12 | 12 |
| Rub Up | 5 | 5 | 5 | 5 | 5 |
| Low Temperature Coalescence | 3 | 3 | 3 | 4 | 6 |
| Color Transfer | 4.0 | 4.0 | 4.0 | 3.5 | 3.0 |
| Blocking | 1.0 | 1.0 | 1.0 | 1.0 | 1.5 |
| Water sensitivity | 1.0 | 1.0 | 1.0 | 1.0 | 1.0 |
| Water stain | 4.0 | 3.0 | 3.0 | 2.5 | 2.5 |
| Wet Adhesion (Scratch off) | 1.0 | 1.0 | 1.0 | 1.0 | 1.0 |
| Wet adhesion (7 days) | 4.5 | 4.5 | 4.5 | 2.0 | 1.0 |
| Scrub | 217/252 | 202/242 | 233/288 | 203/275 | 199/240 |

An exemplary gloss reducer or gloss flattener is shown below:

| Components | % Wt. | Lbs./100 gal. |
|---|---|---|
| Water | 51.2582 | 475.91 |
| Hydroxyethylcullose (HEC) | 0.1077 | 1.0 |
| Dispersant | 3.0157 | 28.0 |
| Preservative | 0.3231 | 3.0 |
| Ammonia | 0.2693 | 2.5 |
| Defoamer | 0.113 | 1.05 |
| HEUR modifier 1 | 4.8467 | 45.0 |
| HUER modifier 2 | 4.3082 | 40.0 |
| Rheology modifier | 2.1541 | 20.0 |
| Surfactant | 1.9387 | 18.0 |
| Diatomaceous Earth (silica) | 4.739 | 44.0 |
| Amorphous matting agent (silica) | 24.234 | 225.0 |
| Matting agent (silica) | 2.6926 | 25.0 |
| Total: | 100% | 928.5 lbs. |

While any matting agents can be used, silica particles having various diameters (weight mean average $D_w$) are preferred. In one example silica particles having average diameters of about 2.5 µm, about 5.3 µm to about 6.3 µm, about 7.8 µm to about 9.4 µm and about 12.4 µm to about 14.4 µm are used. Preferably, silica or matting agent(s) makes up about 25% by weight to about 40%, preferably about 25% to about 35% and more preferably about 30% to about 35% by weight. Other suitable matting agents include but are not limited to polymeric single-stage or multi-stage particles, such as acrylic, vinyl or styrene particles. To maintain such an amount of flattening or matting agent in suspension in water, rheological modifiers, including HEUR modifiers, should make up from about 8% to about 14%, preferably about 9% to about 13% and more preferably from about 10% to about 12% by weight of the gloss reducer. Surfactants and dispersants should be present from about 3% to about 7%, preferably about 4% to about 6% and more preferably from about 4.5% to about 5.5% by weight of the gloss reducer. The ranges and subranges for any component discussed in this paragraph can have any high or low end point for said component.

An exemplary gloss enhancer is shown below.

| Components | % Wt. | Lbs./100 gal. |
|---|---|---|
| Acrylic latex (50% solids) | 94.5% | 852.08 |
| Polyethylene glycol (MW = 400) | 5.5% | 50.0 |
| Optional 1% hydroxylethylcellulose (a cellulosic polymer to resist spattering) | | |
| Total | 100% | 902.08 |

The inventive gloss enhancer should contain mostly latex or resin dispersed in water. It should not contain any opacifying pigments and preferably contains none. Preferably, the solids make up at least about 40%, preferably at least about 45% and preferably at least about 50% of the latex aqueous composition. Polyethylene glycol is used as a dispensing aid for the gloss enhancer or an open time agent.

The rheological modifiers would maintain the viscosity of the final tinted paints after gloss modifiers are added to the factory-manufactured tintable paints. The rheological modifiers unexpectedly reduce the viscosity of the gloss reducer and aid in getting more silica/matting agents, and therefore higher gloss reducing power, into the gloss reducer.

The inventive gloss reducer and the gloss enhancer should be substantially free of opacifying pigments and preferably contains none. As used herein, substantially free means less than about 2% weight solid, preferably less than about 1% weight solid and more preferably less than about 0.5% weight solid. Since the gloss modifiers have substantially no opacifying pigments, the factory manufactured paints 12 without the gloss modifier/adjuster 16 and the final paints with the gloss modifier/adjuster 16 should have substantially the same amount of opacifying pigments, and preferably the same amount of opacifying pigments. As used herein, substantially the same means the difference should be less than about 2% weight solid, preferably less than about 1% weight solid and more preferably less than about 0.5% weight solid.

As stated above, an advantage of the present invention is to reduce the number of color prescriptions for twenty or more tintable base paints to produce a single color. As used herein, colors are sufficiently close to each other to be the same color to people when the color differences (ΔE) among them are less than or equal to about 2.0 CIEDE2000 units, preferably less than about 1.0 CIEDE2000 unit or less than about 0.67 CIEDE2000 unit. Experiments have shown that the human eyes would not be able to distinguish colors that are within 2.0 CIEDE2000 color difference units from each other.

The value of ΔE is calculated using a color difference formula, such as, the CIEDE2000 color difference formula for a 10° standard observer. The CIEDE2000 color difference formula is set forth in G. Sharma, W. Wu, and E. Dalal, "The CIEDE2000 Color-Difference Formula: Implementation Notes, Supplementary Test Data, and Mathematical Observations," Color Res. Appl. 30: pp. 21-30, February 2005, which is incorporated herein by reference in its entirety. As noted in the Sharma paper, CIEDE2000 color difference values are calculated by a methodology that transforms measured CIELAB values into CIE L*C*h (lightness, chroma, hue) color space values. The CIEDE2000 color difference equation comprises weighting factors $k_L$, $k_C$, and $k_H$ for the metric lightness difference, metric chroma difference and the metric hue difference, which in the present invention are 1, 1, 1, respectively. Other suitable color difference equations include the CIELUV, CIELAB and the CIE94 color difference equations.

In the experiments shown below, pastel tintable base paints are mixed with the inventive gloss reducer and gloss enhancer to final tinted paints having various sheens or finishes using a single color prescription. The color differences are calculated below.

| Tinted Paints made from Factory-manufactured Tintable Base Paints | Gloss (60°)† | Sheen (85°)† | ΔE‡ |
|---|---|---|---|
| Tinted with Test Black S1 | | | |
| Flat | 2.8 | 8.3 | 0.22 |
| Matt | 9.0 | 18.9 | 0.17 |
| Eggshell✓ | 13.3 | 30.6 | 0.10 |
| Satin | 25.5 | 52.5 | 0.11 |
| Semi-gloss | 52.1 | 84.1 | 0.19 |
| Tinted to "Feather Soft ™" (light lavender) | | | |
| Flat | 4.9 | 8.1 | 0.55 |
| Matt | 8.1 | 14.1 | 0.48 |
| Eggshell✓ | 13.6 | 26.1 | 0.03 |
| Satin | 26.0 | 46.0 | 0.64 |
| Semi-gloss | 49.3 | 76.2 | 0.54 |
| Tinted to "Feather Soft ™" using tint machine§ for gloss adjustments | | | |
| Flat | 3.7 | 7.8 | 0.26 |
| Eggshell✓ | 13.4 | 34.1 | 0.03 |
| Semi-Gloss | 54.3 | 89.9 | 0.56 |

†average from 3 measurements.
‡measured in CIEDE2000 units.
✓used as the standard color for ΔE calculations; near-zero values caused experimental uncertainty from multiple measurements are reported for the standard.
§tint machines can also store prescriptions for gloss and sheen level in addition to color prescriptions.

As shown above, the final colors of the tinted paints made from the factory-manufactured tintable paints for a single color, e.g., test black S1 or light lavender, using a single color prescription for five sheens and finishes match within about 0.67 CIEDE2000 unit.

Definitions

As used herein the following terms shall have the following meanings.

Tintable paints, base paints, bases or factory-manufactured tintable paints are paints that can be applied to a wall or substrate and formed a film formed from latex encapsulating opacifying pigments, but contain no or substantially no colorants.

Tinted paints or final tinted paints are paints that are mixed from tintable paints, gloss enhancer and/or gloss reducers, and colorants.

Opacifying pigments mean white pigments which impart white scattering power to the paint across all visible wavelengths without a high degree of absorption. Examples of opacifying pigments include titanium oxide and calcium oxide. Opacifying pigments specifically exclude extender pigments. Opacifying pigments providing hiding property to paint compositions.

Extender pigments do not provide hiding and generally mean pigments having low refractive index or opacity and can appear transparent in the dried paint film. However, extender pigments impart specific properties to the paint film, such as improved water resistance (mica), improved durability, anti-corrosive metal primers (barium sulfate), etc. In the present invention, pigments or minerals that have been classified generally in the industry or prior art as extender pigments shall be used specifically and individually with their property(ies) or function(s) in the aqueous paint or dry paint film.

Colorants include aqueous compositions that include organic color pigments, which can be natural or synthetic, inorganic color pigments, and hybrid organic-inorganic pigments. Aqueous colorants may also include surfactants and/or dispersants and other additives. Colorants may also include the pigments in dry forms. Color pigments are discussed in commonly owned U.S. Pat. No. 8,092,909 and U.S. publication no. US 2009/0023850, which are incorporated herein by reference in their entireties.

Descriptions of Tests:

The viscosity of paint compositions were obtained using analysis methods in accordance with standardized methods (e.g., stormer viscosity for mid-shear viscosity, reported in Kreb Units (KU); ICI viscosity for high-shear viscosity, reported in Poise (P)). A higher stormer viscosity indicates a higher load of the brush and the forming of a better film. Viscosity measurements were obtained using a Bohlin CVO Rotational Viscometer (0.5° cone and 4 mm diameter plate).

The water sensitivity test (1 2 and 3 minutes water spot test) is illustrated by the following procedures. Emulsion latex samples were drawn down on a sealed Leneta card (made by BYK for example) to form a dry film using a BYK-GARDNER 3 MIL WET FILM draw down bar. The latex film was air-dried on a flat horizontal surface for one week before testing. To the dried film surface, 3-5 drops of water were placed and the water sensitivity of the latex film was rated using the finger nail scratching method for rating the dry film strength after 1, 2 and 3 minute soaking periods. The wet films are rated for resistance to finger nail scratching from 1 to 5, with 5 being the best.

The water stain resistance is tested by a visual rating of water stain on the dried paint film. A 3 mil film of paint is dried for 7 days at room temperature, and 3 ml of DI water is placed on the horizontal dried paint film for 3 minutes, and then the Leneta card is raised to a vertical position to allow water to flow down across the surface of the film. The film is placed in a vertical position while the water evaporates. The water stain mark on the film surface is visually inspected and assigned a number from 1 to 5, 5 being the best and 1 being the worst.

Block resistance, or the propensity of a coating to adhere to itself instead of to its substrate, is measured according to a modified version of ASTM D4946-89. On a sealed white Leneta™ WK card, a 3 mil thick coating was prepared. After one week of drying at room temperature, the coating was cut into four one inch squares. Two of the squares were oriented face to face (i.e., coated sides touching) and are placed under a 100-gram weight in a 120° F. oven for about 24 hours. The other two of the squares were oriented face to face and placed under a 100-gram weight at room temperature for about 24 hours. Both sets of face to face squares were then allowed to equilibrate to ambient temperature for about ½ hour. Each set of squares was then pulled apart using a slow and steady force, forming a T pattern. Block resistance was rated based on the percentage of area of the paint on one surface that was transferred to the other surface. 0% transfer indicates a perfect blocking resistance while 100% transfer indicated paints on both sides are completely stuck together. Rating is from 1 to 5 with 1 being worst.

The scrub resistance is determined by ASTM Method D2846. In this test, a 7 mil drawdown of paint(s) is prepared on a scrub panel and allowed to air dry at room temperature for one week. A medium bristle brush is soaked overnight in deionized water for conditioning prior to running the test. Two glass plates are placed in the tray of the Abrasion tester, and two brass shims are placed on the plates in such a way that each paint being tested would have a shim under it. The test panel with the dried paint is secured to the two glass plates on the Gardner Abrasion Tester. Ten grams of abrasive scrub medium are applied to the bristles of the brush and the brush is then placed in a brush holder which is secured to the cables of the Abrasion Tester. Five cc of deionized water is applied to the test panel, and the scrub cycles are started. Every 400 cycles another 10 g of abrasive medium is applied to the brush and another 5 cc of deionized water is applied to the panel. The test is continued until paint is removed in one continuous line across its own shim and the number of cycles required to reach this point is recorded.

The wet adhesion test determines the intermediate adhesion of a water base coating prior to full cure. A 3 mil drawdown is prepared on a substrate and dried. Afterward the sample is placed in a 100% relative humidity for four hours. The sample is then inspected for blisters or other blemishes. Fingernail scratch or thumb rub test can be used to check for adhesion. A cross hatch test according to ASTM D3359 method B can also be used after the sample dried. Rating is from 1 to 5 with 1 being worst.

Low-temperature coalescence was measured according to a modified version of ASTM D3793. For each sample, a number of 6"×12" Upson panels were cooled to about 40° F. for about 1 hour. On one half (6"×6" portion) of each panel, a draw down coating of each composition was prepared having a thickness starting at about 3 mils and going to about 12 mils. These panels were then kept about 40° F. in a refrigerator for about 4 hours. The presence or absence of visible cracks on each panel was noted and rated from 3 to 12, based on the thinnest panel on which cracks were first evident, with each number represent its mil-thickness, and with 12 representing that either only the 12-mil thick panel or none of the panels showed cracks.

Paint "sag" is a downward drooping movement of paint that occurs immediately after application. See, e.g., http://www.benjaminmoore.com/en-us/for-contractors/sagging. Sagging measurements of liquid paint are made using a graduated metal applicator that applies the paint on a white-black card, and then the card is positioned vertically. The gradation values of the sagging paint are then read to determine sag resistance in accordance with ASTM D 4400. A lower number indicates more sagging of the paint film.

Flow & Leveling test pertains to a known flow and leveling test. See, e.g., http://www.leneta.com/leveling-test.html and ASTM D 4062. For each sample, a drawdown was made with a flow leveling bar and dried overnight.

Thereafter, a rating of 1 to 10 was assigned, with 10 being the best (i.e., perfectly flat on the drawdown card) and 1 being the worst.

A color transfer test is conducted using felt wrapped on a calibrated 100 g moving weight attached to a scrub machine. The felt covered calibrated weight was pulled back and forth over the surface of the panel coated with the test paint ten times by the scrub machine. The felt was then visually assessed for the amount of color transfer and assigned a numerical rating of 1 (poor) to 5 (excellent).

The color rub-up test generally tests a color change in a wet film, caused by rubbing with the finger, which may not disappear. A thin paint film is deposited on a substrate, such as Lenetta black and white cards, and air dried for a duration that is dependent on the sheen of the paint. An index finger is placed on the film and is twisted a predetermined number of clockwise and counterclockwise directions. The film is then examined for color streaking and a rating from 1 to 5 is assigned with 1 being poor.

Paint gloss or sheen is defined using ASTM Test Method D523 "Standard Test Method for Specular Gloss." Gloss ratings by this test method are obtained by comparing the reflectance from the specimen (at an angle of 20°, 60°, or 85° measured from the vertical) to that from a polished glass standard. Gloss readings at 20° describe the "depth" of gloss and are typically only used to describe gloss or semi-gloss paints. Gloss readings at 60° are used to describe most paints, except for completely flat paints. Gloss readings at 85° describe the "sheen" of flat, eggshell, and satin paints.

Typically, paints are categorized by their gloss values. For example, the Master Paint Institute (MPI) categorizes paints as follows:

TABLE

The Reflectivity of Paints with Different Gloss At Different Angles

| Type of Paint Finish | 20° Gloss | 60° Gloss | 85° Gloss |
|---|---|---|---|
| High Gloss | 20-90 | 70-85+ | — |
| Semi-Gloss | 5-45 | 35-70 | — |
| Satin | — | 20-35 | min. 35 |
| Eggshell | | 10-25 | 10-35 |
| Flat/Matte | | 0-10 | max. 35 |

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A method for adjusting a factory-made tintable paint at a point of sale comprising the steps of
   receiving the factory-made tintable paint in a plurality of containers, wherein each container comprises a first amount of opacifying pigment,
   adjusting a finish of the factory-made tintable paint by adding at least one of a gloss reducer or a gloss enhancer into at least one container, wherein the gloss reducer comprises a matting agent and wherein the gloss enhancer comprises a latex resin to produce a second tintable paint,
   wherein a second amount of opacifying pigment in the second tintable paint is substantially the same as the first amount,
   wherein the gloss reducer comprises from about 25% to about 40% matting agent.

2. The method of claim 1, wherein the first and second amounts of opacifying pigments are the same.

3. The method of claim 1, wherein the gloss reducer comprises from about 25% to about 35% matting agent.

4. The method of claim 3, wherein the gloss reducer comprises from about 30% to about 35% matting agent.

5. The method of claim 1, wherein the gloss reducer comprises from about 8% to about 14% of rheological modifier.

6. The method of claim 5, wherein the gloss reducer comprises from about 9% to about 13% of rheological modifier.

7. The method of claim 6, wherein the gloss reducer comprises from about 10% to about 12% of rheological modifier.

8. The method of claim 1, wherein the gloss reducer comprises from about 3% to about 7% of surfactants and dispersants.

9. The method of claim 1, wherein the matting agent comprises a plurality of average sized silica particles.

10. The method of claim 1, further comprises the step of adding at least one colorant into said at least one container to form a tinted paint.

11. The method of claim 1, wherein the finish is selected from a group consisting of a high gloss, a semi-gloss, a satin, an eggshell and a flat/matte, wherein the high gloss has a gloss value at 60° between 70 and 85 or higher, wherein the semi-gloss has a gloss value at 60° between 35 and 70, wherein the satin has a gloss value at 60° between 20 and 35, wherein the eggshell has a gloss value at 60° between 10 and 25, and wherein the flat/matte has a gloss value at 60° between 0 and 10.

12. A method for adjusting tintable paint comprising the steps of
    receiving or preparing the tintable paint,
    adding at least one of a gloss reducer or a gloss enhancer to the tintable paint to produce a plurality of second tintable paints having different glosses,
    tinting the plurality of second tintable paints with a single color prescription to produce a plurality of tinted paints,
    wherein the color difference between any two tinted paints with different glosses is less than about 2.0 CIEDE2000 units.

13. The method of claim 12, wherein the glosses are selected from a group consisting of a high gloss, a semi-gloss, a satin, an eggshell and a flat/matte,
    wherein the high gloss has a gloss value at 60° between 70 and 85 or higher,
    wherein the semi-gloss has a gloss value at 60° between 35 and 70,
    wherein the satin has a gloss value at 60° between 20 and 35,
    wherein the eggshell has a gloss value at 60° between 10 and 25, and
    wherein the flat/matte has a gloss value at 60° between 0 and 10.

14. The method of claim 13, wherein the color difference between any two tinted paints with different glosses is less than about 1.0 CIEDE2000 unit.

15. The method of claim 14, wherein the color difference between any two tinted paints with different glosses is less than about 0.67 CIEDE2000 unit.

16. The method of claim 13, wherein the gloss reducer comprises about 25% to about 40% matting agent.

17. The method of claim 16, wherein the matting agent comprises a plurality of average sized silica particles.

* * * * *